United States Patent [19]

Nakamura et al.

[11] Patent Number: 5,235,369
[45] Date of Patent: Aug. 10, 1993

[54] PHOTOGRAPHIC PICTURE-TAKING FILM PROCESSING

[75] Inventors: Takashi Nakamura, Minami-ashigara; Yasuhisa Ogawa, Hadano, both of Japan

[73] Assignee: Fuji Photo Film Co., Ltd., Kanagawa, Japan

[21] Appl. No.: 782,107

[22] Filed: Oct. 24, 1991

[30] Foreign Application Priority Data

Oct. 24, 1990 [JP] Japan .................................. 2-286419
May 22, 1991 [JP] Japan .................................. 3-146777

[51] Int. Cl.[5] ......................... G03D 3/00; G03D 3/02
[52] U.S. Cl. ..................................... 354/298; 354/324
[58] Field of Search ........................ 354/298, 324, 297; 430/21, 30, 501

[56] References Cited

U.S. PATENT DOCUMENTS

| | | | |
|---|---|---|---|
| 3,559,555 | 2/1971 | Street | 354/298 |
| 4,757,334 | 7/1988 | Volent | 354/298 X |
| 5,083,152 | 1/1992 | Tokuda | 355/27 |
| 5,180,648 | 1/1993 | Nakamura | 430/21 |

Primary Examiner—D. Rutledge
Attorney, Agent, or Firm—Sughrue, Mion, Zinn, Macpeak & Seas

[57] ABSTRACT

A method for continuously processing a plurality of photographic picture-taking films is provided. The printing information used in making prints from a processed film, for example, an exposure quantity upon printing, and the density information of the processed film, for example, the density of each frame of the processed film are used as a decisive factor for determining a processing condition under which subsequent films are processed. The amount of processing solution to be replenished is controlled by taking into account the processing of the preceding film, thereby achieving optimum processing performance.

20 Claims, 8 Drawing Sheets

PHOTOGRAPHIC PICTURE-TAKING FILM PROCESSING

CROSS-REFERENCE TO THE RELATED APPLICATION

Reference is made to my copending application No. 07/775,097 filed Oct. 11, 1991, for "Photographic Picture-Taking Film Processing" now U.S. Pat. No. 5,180,648.

This invention relates to a method for processing photographic picture-taking films.

BACKGROUND OF THE INVENTION

Photographic silver halide photosensitive material, hereinafter referred to as photosensitive material after exposure is processed through a series of steps including color development, desilvering, washing and stabilization in the case of color photosensitive material. There are used color developer for color development, bleaching, blix and fixing solutions for desilvering, city water for washing, and stabilizer for stabilization. Black-and-white photosensitive material is processed through a series of steps including black-and-white development, fixation, and washing. In either case, photosensitive material is generally processed by dipping them in the respective solutions which are normally adjusted to a temperature of 20° to 50° C.

In the commercial practice of such processing of photo-sensitive material, it is desired to achieve stable and acceptable processing performance with a permissible minimal amount of processing solution for the purposes of reducing the cost, manual work, pollution loads, and processor size as well as improving the commodity value of processed ones.

The stability of processing performance is obtained by maintaining the processing solution composition within a desired range at all times and the superiority of processing performance is obtained by uniform immersion in a sufficient volume of processing solution.

Therefore, as found in color development laboratories, the commercial practice of processing color photosensitive material uses an automatic processor having processing tanks containing large volumes of processing solution. The processor is designed such that whenever a predetermined quantity of color photosensitive material has been processed, a replenisher is automatically fed to the used processing solution to compensate for its exhaustion and maintaining the processing solution within the desired composition range.

In response to the consumers desire to get color prints instantaneously and interest in color processing business with small investments and the like, the color photosensitive material processing is in the phase of shifting from the conventional centralized processing in big laboratories to diversified small quantity processing in many mini-labos and further to small quantity rapid processing.

The processing steps for photosensitive material will now be discussed. Development and bleaching steps of processing imagewise exposed film, typically use processing solutions which experience a varying degree of exhaustion since the amount of silver to be developed with exposure. In the prior art, the operator decided processing conditions by presuming the degree of exhaustion of the processing solution from the known number of film rolls processed or film length. However, since the amount of silver to be developed varies with exposure conditions which in turn, vary with each of exposed picture frames, the degree of exhaustion of the processing solution varies between different film strips. Therefore, for obtaining good and uniform pictures, it is desirable to determine processing conditions for an individual film strip by considering its exposure conditions.

Particularly, in the case of a mini-labo processor intended for small quantity rapid processing, a limited size processing tank is filled with relatively small volume of processing solution which relatively experiences a greater degree of exhaustion per roll of film. It is then desirable to determine processing conditions for an individual roll of film by taking into account the amount of silver developed inherent to the film.

The mini-labo processor has to be kept in the standby state in which the processing solutions are adjusted to optimum temperature so as to quickly meet the consumers' demand while the processing quantity widely varies day by day. Slit type processing tanks which are designed to provide effective processing with a minimized amount of processing solution in each tank are unsusceptible to daily variations in processing quantity because a larger proportion of the processing solution in each tank is replaced by replenisher solution, but are affected by the degree of exhaustion of processing solution (that is, the amount of silver in film to be developed) varying between different types of film. Therefore, the slit type processing tanks can introduce a difference in processing performance between different types of film.

SUMMARY OF THE INVENTION

Therefore, an object of the present invention is to provide a picture-taking film processing method capable of processing a plurality of films under conditions optimum for each film, eliminating the drawbacks of the prior art.

In one form of the present invention, there is provided a method for continuously processing a plurality of photographic picture-taking films. The printing information used in making a print from a processed film or the density information of the processed film or both are obtained. A processing condition, typically an amount of processing solution to be replenished is determined using the information as a decisive factor. Subsequent films are processed under the determined condition. Processing is used in the context of ordinary photographic film processing and typically includes development, bleaching, and fixation.

In another form wherein the photographic picture-taking film has picture information born on itself or on a container for the film, the step of determining a processing condition further uses the picture information as another decisive factor. Preferably, the film contains up to 4 perforations per frame along one or both lateral edges thereof.

Where the processing condition is an amount of processing solution to be replenished, the step of determining a processing condition includes the steps of predetermining a standard amount of processing solution to be replenished during processing, determining a coefficient of correction from the printing information and/or the density information, and multiplying the standard amount by the coefficient of correction, thereby determining the amount of processing solution to be replenished.

More particularly, the amount of processing solution to be replenished is determined by determining a first coefficient of correction from the picture information, determining a second coefficient of correction from the printing information and/or the density information of the processed film, dividing the standard amount into two portions, and multiplying the divided standard amount portions by the first and second coefficients of correction, respectively. Alternatively, one divided standard amount portion is a fixed amount and the other divided standard amount portion is multiplied by the coefficient of correction associated with the printing information and/or the density information of the processed film.

In a further form, a system for carrying out the method is provided. A length of exposed film in roll form is contained in a cassette and the film itself or the cassette carries picture information thereon. The system includes a processing apparatus and a printing apparatus interconnected thereto. The processing apparatus includes a supply means for storing cassettes, a loading means for loading the apparatus with the film by pulling out the film leader from the cassette, a reading means for reading the picture information on the film or cassette, a cutter means for cutting the film at the trailing edge to free the film from the cassette, and a bonding means for bonding the leading edge of the film to the trailing edge of a preceding length of film. The printing apparatus is electrically connected to the processing apparatus through a control unit so that the printing information is available at the control unit for determining a processing condition.

With the present invention, a plurality of exposed photographic picture-taking films are continuously processed by measuring the density of a processed film, determining a processing condition on the basis of the measured density, and continuing subsequent processing under the determined condition. An adequate processing condition is maintained during continuous processing so that satisfactorily and uniformly processed films are obtained. An amount of processing solution to be replenished is one of the processing conditions that can be controlled such that the processing solution is maintained at an optimum value by diluting the concentration of exhausted solution with the minium amount of replenishing processing solution. This results in a saving of processing solution and satisfactorily and uniformly processed films. Film density measurement is performed by utilizing a detection value of a light quantity sensor built in the printing apparatus or the density of film read just prior to printing.

When the processing condition is determined by additionally taking into account the picture-shooting information born on the film, processing is achieved in conformity to the exposure upon picture shooting, that is, over- or under-exposure.

It is to be noted that the processing condition used herein is one or more of the conditions associated with the processing of photographic film with processing solution, including processing temperature and time, solution agitation, solution replenishing amount and mode. Most often, the processing condition is a solution replenishing amount or mode.

BRIEF DESCRIPTION OF THE DRAWINGS

The above and other objects, features and advantages of the present invention will become apparent by reading the following description taken in conjunction with the accompanying drawings.

DESCRIPTION OF THE PREFERRED EMBODIMENTS

Figure 1:
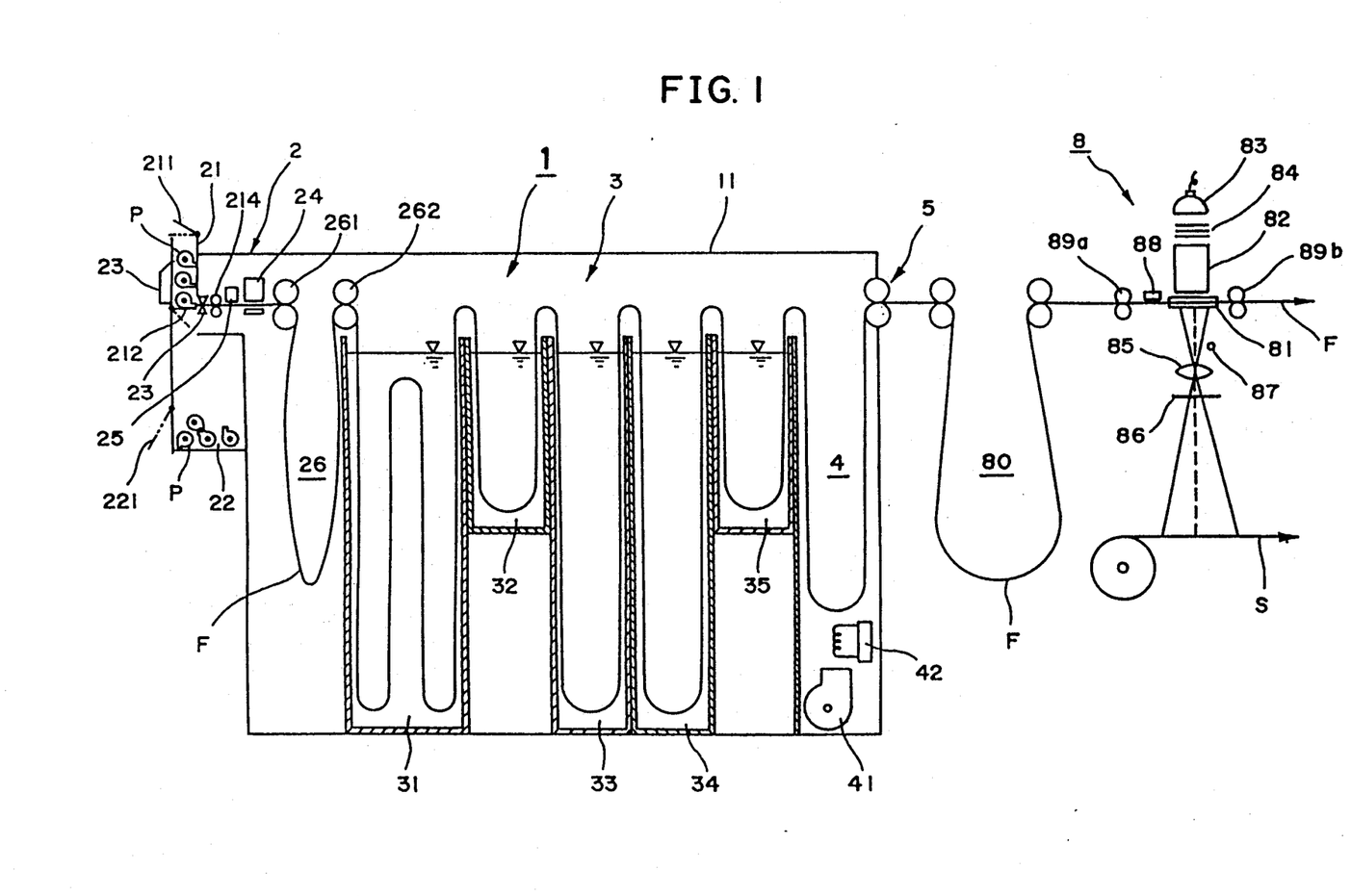
FIG. 1 is a schematic view showing an exemplary arrangement of a photographic picture-taking film processor and a printing apparatus combined for practicing the method of the present invention.

Referring to FIG. 1, there is schematically illustrated in side elevation an exemplary arrangement of a photographic picture-taking film processor generally designated at 1 combined with a printing apparatus generally designated at 8 for practicing the method of the present invention.

The processor 1 includes an entry section 2 for receiving strips of exposed photographic film F, a processing section 3 for processing film F, a drying section 4 for drying film F, and an exit section 5 for carrying out film F, all contained in a light shielding casing 11 capable of maintaining light tightness.

The entry section 2 includes a loader or storage 21 for stocking cassettes or cartridges P of roll film in a vertical arrangement and loading the processor with the film. The loader 21 has a cover 211 at the top for sealing the loader against light. The loader 21 near the bottom is provided with lead-in means for locating a cassette P in place, rotating its spool, and pulling out the leader of film F, though not shown in FIG. 1. A cutter 213 is located near a film lead-out port of the loader 21 for cutting film F when the entire length of film F has been pulled out of the cassette P. The film F from the cassette P is extended through the lead-out port into the casing interior while it is guided by pairs of rollers 214 and 261.

The loader 21 at the bottom has a discharge shutter 212 which is opened for dropping down the cassette P when it is emptied of film F by the operation of the lead-in means and cutter 213. Located below the loader 21 is a collection chamber 22 for collecting empty cassettes P which are then discharged to the outside by opening a lid 221. Also located near the loader 21 is an operating panel 23 for the processor.

Reading means 25 is disposed in proximity to the film lead-out port of the loader 21 and behind the cutter 213 for reading the picture information born on film F (to be described later). In the case of film F having information recorded in its magnetic layer, the reading means 25 is a magnetic reader having a magnetic head for reading the information in the film magnetic layer.

Located along the travel path of film F and inward of the reading means 25 is bonding means 24 for joining the leader of a newly pulled-out film F to the trailing edge of a previously pulled-out film F into a continuous length of film. The joint may be formed by bonding the film edges with an adhesive tape or by bonding or fusing the film edges with heat or pressure. The bonding means 24 may be an adhesive tape applicator, heat sealer, RF fusion device, stapler, or the like. Of course, the bonding means 24 may be omitted insofar as films F can be successively fed through the processor. With the bonding means 24, films F are continuously fed through the processing section 3 while their leading and trailing edges are connected to the preceding and following films.

As mentioned above, the reading and bonding means 25 and 24 are disposed along the path for film F. Disposed between the bonding means 24 and the processing section 3 is a reservoir 26. The reservoir 26 is defined in the casing 11 and includes a pair of timing rollers 261 adapted to rotate in response to the bonding operation of the bonding means 24 and a pair of normally rotating feed rollers 262 disposed at the entrance port of a developing tank 31. As shown in FIG. 1, film F being fed sags between the timing and feed rollers 261 and 262. The reservoir 26 plays the buffer role, that is, the role of adjusting the difference between the feed rate of film F being extended out of the cassette P and the feed rate of film F passing through the processing section 3.

The processing section 3 includes a plurality of processing tanks. Arranged in the processing section 3 from the entry section 2 side are a developing tank 31, a bleaching tank 32, a fixing tank 33, a washing tank 34, and a stabilizing tank 35, which are filled with respective processing solutions. Disposed in the respective tanks and between the adjacent tanks are feed means for feeding film F forward including rollers and guides (not shown). The film F is fed along a serpentine path depicted by a phantom line in FIG. 1 so that it is successively dipped in and processed with the processing solutions in the developing, bleaching, fixing, washing and stabilizing tanks 31, 32, 33, 34, and 35.

The distribution and arrangement of tanks in the processing section 3 are not limited to the illustrated ones. The processing tanks as typified by the developing tank 31 may be ones having a narrow processing path as disclosed in Japanese Patent Application Nos. 89052/1987, 131138/1988, 216050/1988, 26855/1989, and 130548/1989 because the advantages including reduced processing solution replenishing amount, reduced waste solution amount, improved processing efficiency, reduced size of processor are achieved. Additionally, the control of the amount of processing solution replenished according to the invention become more effective since the amount of processing solution replenished to each tank is very small.

Figure 3:
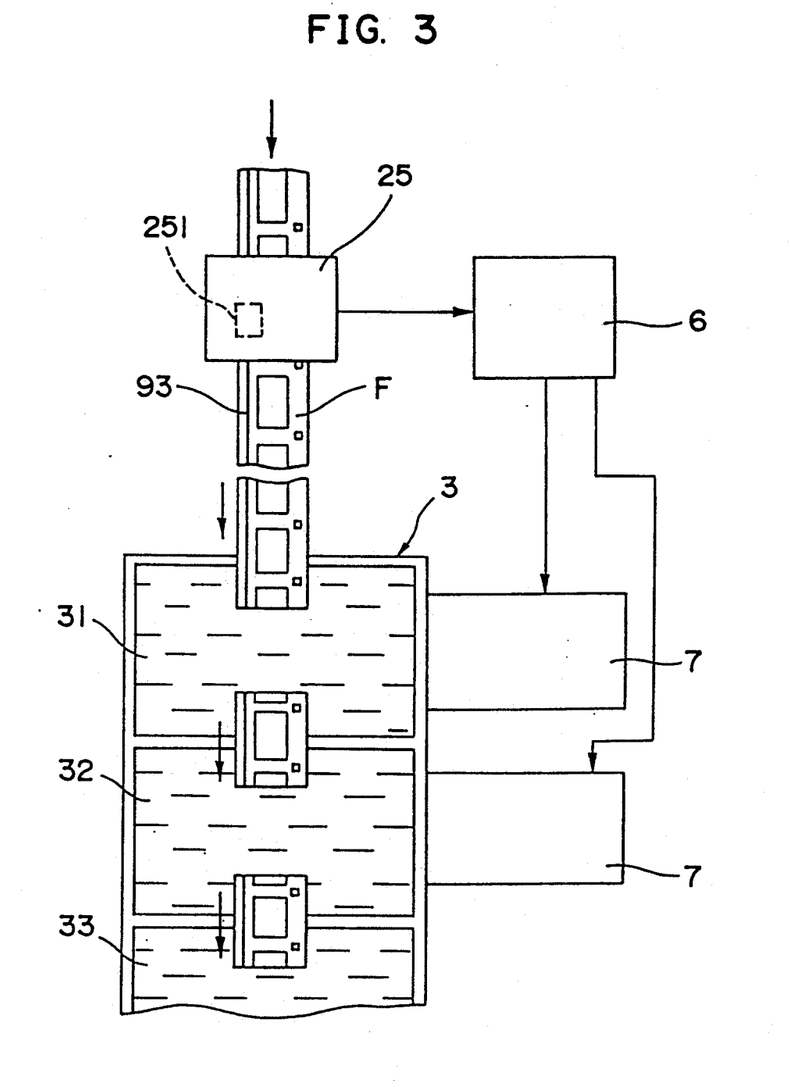
FIG. 3 is a plan view showing reading means relative to the film and a block diagram showing the control system including the reading means, control unit, and replenishing means.

The processor 1 includes a replenishment system for making up a fresh replenisher to each processing solution when necessary, while allowing the exhausted solution exits the tank in an overflow manner, thereby maintaining the processing solution in the tank at an effective composition range. As shown in FIG. 3, each of the processing tanks is provided with replenishing means 7 including a reservoir tank containing a replenisher which is channeled to the processing tank associated therewith. The replenishing means 7 is controlled by a control unit 6 to be described later whereby a controlled amount of replenisher is channeled to the tank when required.

The processing section 3 on the exit side is followed by the drying section 4. The drying section 4 serves to dry the as-processed film F in wet condition by blowing warm air at about 30° to 70° C. To this end, a blower 41 and a heater 42 are arranged in the drying section 4 for blowing warm air toward film F.

The dry film F is delivered to the outside of the processor 1 through the exit section 5 in the form of a pair of rollers and then to the printing apparatus 8. As shown in FIG. 1, the film F after color development is carried to the printing apparatus 8 through a reservoir 80 of the same structure as the reservoir 26.

The printing apparatus 8 is now described.

A film path is defined by pairs of rollers 89a and 89b and a carrier 81 for carrying the film F forward. A mirror box 82 and a lamp house 83 having a halogen lamp built therein are disposed above the carrier 81. Between the mirror box 82 and the lamp house 83 is disposed a correction filter 84 which is composed of three color filters, Y (yellow), M (magenta), and C (cyan) filters as is well known in the art. Below the carrier 81 are disposed a lens 85, a black shutter 86, and a strip of color paper S in this order. Light emitting from the lamp house 83 is transmitted by the correction filter 84, mirror box 82 and film F and focused on the color paper S through the lens 85.

A sensor 87 is disposed on the lower side of the carrier 81 remote from the lamp house 83 for detecting the quantity of light. This sensor 87 measures the quantity of light from the lamp house 83 transmitted by the processed film F, thereby measuring the density of the film F.

Means 88 is located between the feed roller 89a and the carrier 81 for detecting the density of the film F. The density detecting means 88 includes an emitter section for emitting detection light toward the film and a detector section for receiving the detection light reflected by the film. As the film F is fed forward, this detector 88 is preferably moved transverse to the film to continuously detect a variation in the density of the film F in its transverse direction. Density detection is not limited to the detection of reflected light and the detection of transmitted light is acceptable.

Figure 4:
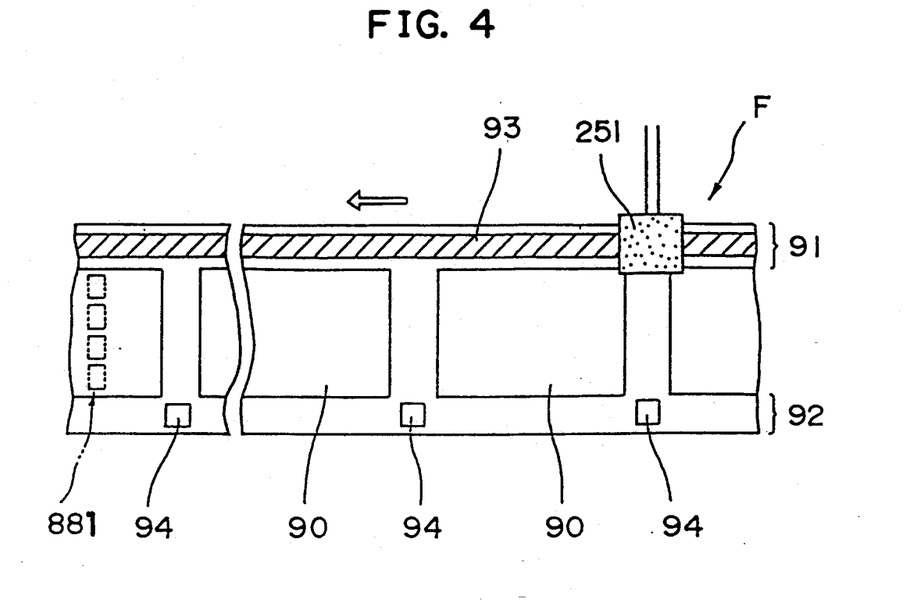
FIG. 4 is a fragmentary plan view of a film to be processed.

The density detector means 88 can detect a variation of density in the feed direction and thus detect the position of each exposed frame, enabling correct alignment of the exposed frame in the printing position within the carrier 81. Instead of the movable detector mentioned above, the density detector means 88 may be a plurality of stationary detectors 881 arranged transverse to the film F as depicted in FIG. 4. The detection of an exposed frame is by detecting a frame having a density of above a predetermined value, for example, at least 0.03 to be an exposed frame.

Figure 2:
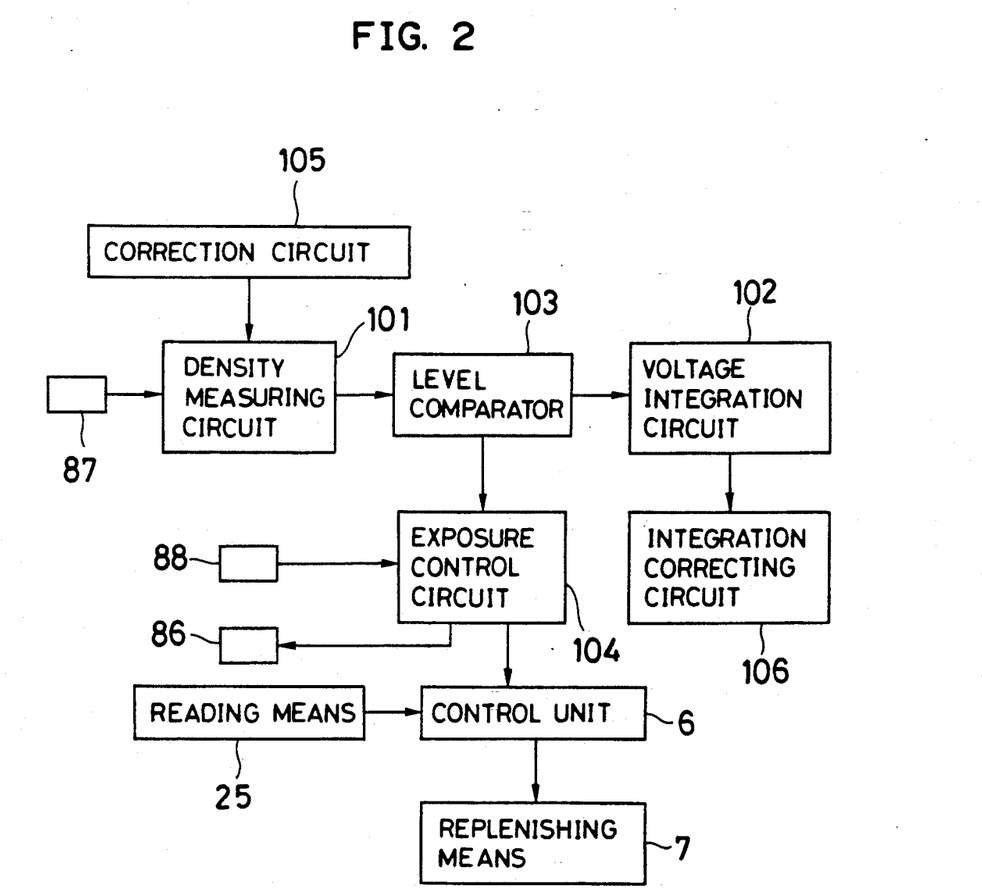
FIG. 2 is a block diagram of a control system.

FIG. 2 is a block diagram showing a system for controlling the printing apparatus 8. The control system includes a density measurement circuit 101, a level comparator 103, and a lamp voltage integration circuit 102 producing a signal indicative of the quantity of light emitted by the lamp in the lamp house 83. A measurement signal of the light quantity sensor 87 is input to the density measurement circuit 101. The level comparator 103 compares a light quantity signal from the lamp voltage integration circuit 102 with an output of the density measurement circuit 101. The result of comparison is input to an exposure control circuit 104 as the density of an exposed frame. The exposure control circuit 104 evaluates the result of comparison from the comparator 103 and determines printing conditions such as exposure time and exposure quantity on the basis of the density of one exposed frame of the film, thereby regulate the opening of the black shutter 86.

Alternatively, printing conditions may be determined directly from the density of an exposed frame detected by the density detector means 88. Both the light quantity sensor 87 and density detector means 88 may be used for determining printing conditions.

Whenever a picture is printed on color paper, the evaluated value of the exposure control circuit 104 or the density information of density detector means 88 is input to the processing control unit 6 associated with the film processor 1 (see FIG. 3). That is, for each exposed frame, the evaluated value is delivered to the control unit 6. The control unit 6 also receives the picture information born on the film F from the reading means 25. The processing control unit 6, which may be a microcomputer, controls the replenishing means 7 for replenishing a controlled amount of replenisher solution to the processing tank associated therewith.

Figure 5:
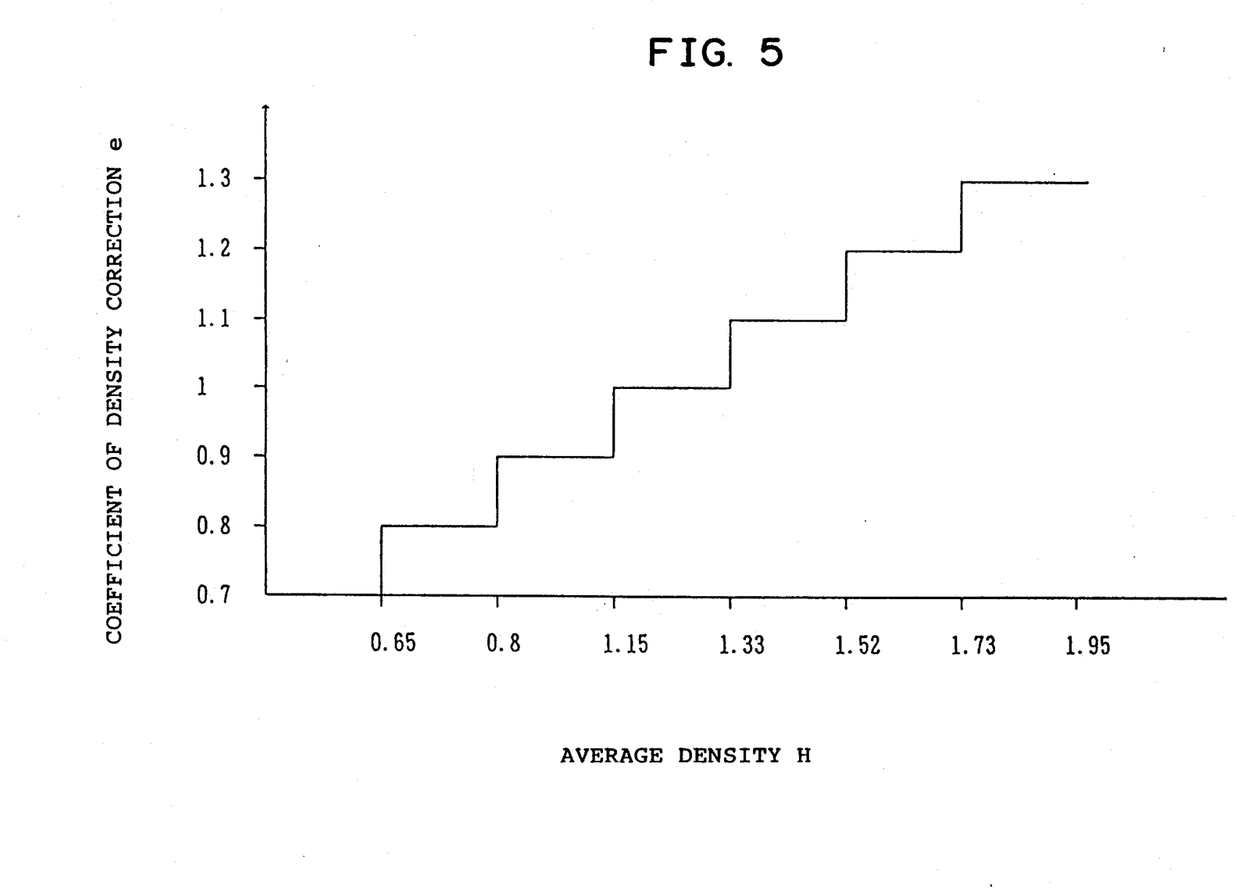
FIG. 5 is a graph showing a coefficient of density correction $e$ versus the average integrated density H of image densities of a processed film.

Since the exposure control circuit 104 is generally designed to determine a logarithm converted value of the image density of each exposed frame or frame to be printed at this point of time, the processing control unit 6 integrates the density of a series of exposed frames using logarithmic values as density signals. More particularly, an integrated density D is determined by integrating the density signals over a certain surface area (a certain length of film, for example, a length of roll film). The integrated density D is then divided by the number of exposed frames in the film n to calculate an average density H ($=D/n$). The relationship between the average density H and a coefficient of correction for replenishment $\underline{e}$ is predetermined as shown in the graph of FIG. 5. Then the coefficient of density correction $\underline{e}$ is determined from the average density H on the basis of the graph of FIG. 5. In addition to the average of integrated density, the parameter for determining coefficient of density correction $\underline{e}$ may be an exposure time and exposure quantity associated with the printing apparatus 8, preferably an exposure quantity divided by an exposure time.

Referring to FIG. 2 again, the density measurement circuit 101 and the voltage integration circuit 102 are connected to correction circuits 105 and 106, respectively, for correcting the non-linearity of electric signal system.

These density measurements provide the information which is normally utilized in making prints from a photographic picture-taking film. The invention utilizes this information for controlling the amount of processing solution to be replenished in the processor combined with the printing apparatus.

As understood from the foregoing, the printing information is used in determining an exposure time for color paper in the printer on the basis of the density information from the detector. In this sense, the printing information is equal to the density information. They are different in that the density information is primary information and the printing information is secondary information obtained by converting the density information in accordance with the sensitivity and type of color paper. Therefore, either the printing information or the density information may be used in the method of the present invention.

Another factor to be considered is the leader of film. Since the leader portion is exposed to light when the camera is loaded with the film. The amount of silver to be processed largely varies with the length of this non-image-bearing exposed portion (known as fogged portion). It is thus preferred to correct the replenishment amount in accordance with the length of the exposed leader portion. This is accomplished by the density detector means 88 which reads the length of a non-image-bearing exposed leader portion and mis-shot frames if any, which is used as one of decisive factors for the coefficient of density correction $\underline{e}$. Alternatively, a replenishment amount may be separately determined from such a length. The area of a non-image-bearing exposed leader portion is determined as an area of film covering from the leading edge to where an unexposed portion is first detected. It is also possible to measure an average density of the entire film F by the density detector means 88 and to determine a coefficient of correction $\underline{e}$ from the average density.

Now, the film F to be processed through the processor as mentioned above is described. The picture-taking photographic film used herein is one adapted for loading in a camera and having on a support at least one color-sensitive layer, preferably two or three commonly color-sensitive layers of an AgBrI emulsion preferably containing 2 to 20 mol %, more preferably 3 to 10 mol % of iodine. Color films have blue, green, and red-sensitive emulsion layers containing yellow, magenta, and cyan couplers, respectively. The preferred amount of Ag coated ranges from 3 to 10 grams per square meter. The preferred support is a transmissive plastic support. Typical films have an ISO sensitivity of 100 to 3200.

The film F should carry the information about exposure conditions upon picture taking, for example, in the form of magnetic or optical signals. One exemplary film is shown in FIG. 4.

As shown in FIG. 4, film F is a length of strip including a series of rectangular frames or image areas 90 created by picture taking or exposure and a pair of lateral bands 91 and 92 defined transversely outward of the frames 90 and longitudinally extending along the opposite edges of the length of strip. The lateral band 91 is mainly used as an information recording or carrying site and often a magnetic recording portion in the form of a magnetic layer is formed. That is, the lateral band 91 on the front (emulsion side) or rear surface of film F is provided with a magnetic recording track 93 (shaded in FIG. 4). Bits of information relating to the exposure conditions during picture taking are recorded in the magnetic recording track 93 typically within the camera, preferably frame by frame.

The reading means 25 includes a magnetic head 251 located along the film path in alignment with the magnetic recording track 93. The film F is longitudinally passed across the head 251 so that the magnetic recording track 93 comes in contact with the head 251 whereby the head 251 reads the information in the track 93 to produce electrical signals.

The other lateral band 92 is provided with perforations 94 for feeding and indexing the film within the camera. Preferably the film contains up to 4 perforations, more preferably up to 2 perforations, most preferably 1 or ½ perforation per frame as shown in FIG. 4. It is to be noted that ½ perforation per frame means that the normal frame 90 shown in FIG. 4 is divided into half-size frames. The provision of up to 4 perforations per frame along only one lateral band 92 ensures that an extra area is available for forming the information carrying portion such as the magnetic recording track 93.

The information to be recorded in the magnetic recording track 93 includes a degree of over- or short-exposure of each exposed frame 90, especially with respect to the sensitivity of the film. More particularly, the information includes the prescribed data of film including the sensitivity and type (for example, general or professional, make, etc.) thereof, and the data of actual shooting of each frame including shutter speed, stop, LV (light value without strobe flashing), rear light, strobe flashing, light quantity of flashed strobe, and strobe-to-object distance. A selected one or ones of these data can be utilized.

In addition to the above-mentioned information relating to film and its exposure, the magnetic recording track 93 may carry additional bits of information, for example, shooting data such as color temperature, object distance, lens focal length, object contrast, and shooting date, time, and place, film data such as the manufacturer, type and manufacturing date of film, and laboratory data such as developing conditions.

The film data may be borne on film at one or more sites, often at one site, for example, at the leading or trailing edge of the film.

Understandably, the construction of film is not limited to that shown in FIG. 4. For example, instead of the magnetic recording track 93, the information recording portion may be embodied by forming a transparent magnetic layer on the rear surface of film where the information can be recorded.

Various types of film can be processed according to the present invention, including color reversal film, color negative film, and black-and-white negative film, and if desired, micro film. Either a length of film or a sheet of film is acceptable. The invention is advantageous when applied to a length of film because the exposure condition of each frame can be detected. The film may be of any desired size although it is most often of 35 mm wide.

Also contemplated herein is to magnetically or electrically record the information of film on a cassette P which is a container for the film. In this case, the cassette P is provided with a magnetic recording track as mentioned above or an IC memory where the information is recorded or stored. In the embodiment where the cassette P has information born thereon, the arrangement of FIG. 1 should be modified such that the reading means 25 is located in the loader 21 so as to face the cassette P near the lead-out port. The reading means can read the information instantaneously, resulting in a reduction in computing time. This type of cassette has the advantage of preventing a film leader portion from being exposed during loading because the camera is loaded with the cassette with the film fully received in the cassette and the film is then pulled out of the cassette within the camera.

Referring to FIG. 3, the control system includes in electrical connection the reading means 25, the control unit 6 and replenishment means 7 associated with the developing and bleaching tanks 31 and 32. Signals indicative of the information read by the reading means 25 are delivered to the control unit 6 which is located within the operating panel 23 in FIG. 1, for example. If desired, the data of a bar code on the film F and/or the data of a DX code on the cassette may also be input to the control unit 6.

The control unit 6 selects necessary data from the input data, performs predetermined arithmetic operation of the data, thereby determining the amounts of processing solutions to be replenished to the developing and bleaching tanks 31 and 32.

Figure 7:
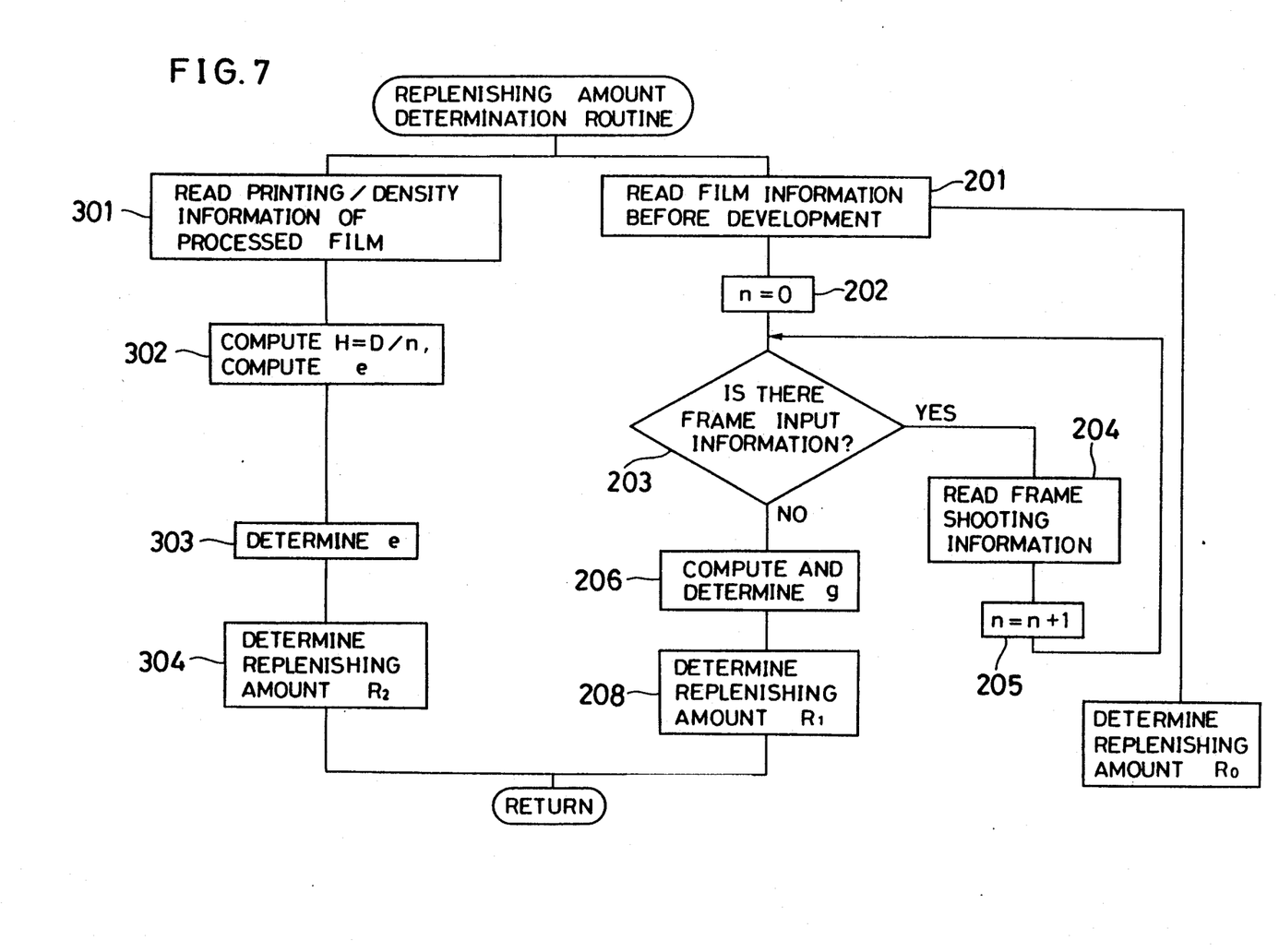
FIG. 7 is a flow chart showing algorithms for determining processing solution replenishment.

Referring to FIG. 7, the algorithm taken by the control unit 6 for determining the amount R of processing solution to be replenished to the developing or bleaching tank 31 or 32 is now described. This computation utilizes a coefficient of correction e based on the density of processed film F and a coefficient of correction g based on the picture information before development. FIG. 7 is an operational flow chart of the control unit 6.

Assume that a length of exposed film F enters the processor. Step 201 is to read the data recorded at the leader of film F before development. Step 202 is to initialize the n memory for inputting the number of exposed frames 90, that is, to input 0. Step 203 is to judge whether or not the incoming film F has the shooting data of each frame 90 recorded in the magnetic recording track 93. If film F has the shooting data, the data is read in step 204, the number of frames is counted in step 205, and the algorithm returns to step 203. In this way, the shooting data of every frame 90 are read in steps 203 to 205. If step 203 finds that the film has no further frame input data, the algorithm proceeds to step 206 for extracting necessary data from all the read information data and computing a coefficient of correction g on the basis of the necessary data in a manner as will be described later. Using the coefficient of correction g, step 208 is to determine the amount R1 of processing solution to be replenished to the developing or bleaching tank 31 or 32.

The replenishing amount decision routine of FIG. 7 includes another algorithm which starts from step 301 for reading the printing/density information of the processed film. Step 302 is to compute an average density ($H = D/n$) and compute a coefficient of density correction $\underline{e}$ from $D/n$. Alternatively, a coefficient of density correction $\underline{e}$ is computed from an exposure quantity divided by an exposure time as previously described in connection with FIG. 2. Step 303 is to decide a coefficient of density correction $\underline{e}$ by plotting the average density of exposed frames of the preceding film from the exposure control circuit 104 in the graph of FIG. 5. Using the coefficient of correction $\underline{e}$, step 304 is to determine the amount R2 of processing solution to be replenished to the developing or bleaching tank 31 or 32.

Then the actual replenishing amount is determined by combining R1 and R2.

Next step is to actuate the replenishing means 7 in a controlled manner so that the replenishing means 7 may feed the metered amounts of replenishers.

In this way, control operation is taken for each film F whereby an optimum amount of replenisher solution is made up for each film. In the case of an IC memory having information data stored therein, the data can be read instantaneously, resulting in an increased processing rate since steps 202, 203, 204, and 205 can be eliminated.

The computation algorithm of step 206 is described. This computation utilizes data selected from the film data including sensitivity, number of available frames (e.g., 24 or 36 frames) and number of exposed frames, and the actual shooting data including shutter speed, stop, LV (light value without strobe flashing), rear light, strobe flashing, light quantity of flashed strobe, and strobe-object distance.

Assuming an ideal film having all the frames 90 thereof exposed under a rear light-free condition with optimum exposure quantity relative to the film sensitivity without flashing a strobe (the exposed film contains no blank frame), the computation algorithm determines the amount of processing solution to be replenished for processing the ideal film as a standard replenishment amount Ro. The standard replenishment amount Ro used herein is an amount of replenisher solution to be made up to the tank which is determined by taking into account (A) the exhaustion and leaching of components during processing of photosensitive material and (B) the exhaustion of components in replenisher and tank solutions normally subject to oxidative degradation. The exhaustion of components normally subject to oxidative degradation is a degree of air oxidation occurring when a processor having a degree of opening of 0.005 to 0.05 is operated at a standard solution replacement (proportion of replenisher amount relative to tank solution for a certain period)=0.3 to 2 rounds/week. Exhaustion factor (B) has a weight of 5 to 25% of exhaustion factor (A). Briefly stated, the standard replenishment amount is a normal replenishment amount without any control.

Coefficients of correction may be determined provided that the standard replenishment amount Ro is unity (1). The coefficients of correction are multiplied for every frame of film to be processed and averaged to provide a coefficient of correction g for the film. Then the replenishment amount Rg for the film is determined by the following equation.

$$Rg = Ro \times g$$

More precisely, $\underline{e}$ is determined by equation (1).

$$g = a \times \sum_{j=1}^{n'} (bj \times cj \times dj)/n' \quad (1)$$

In equation (1), a is a coefficient of correction for blank frames, a=n'/N wherein N is the number of available frames per film and n' is the number of exposed frames, that is, N minus the number of unexposed frames. Actually, n' is obtained by determining the exposure quantity from a reading of picture-shooting information, determining the number of frames having an insufficient exposure quantity to expose the film, and subtracting the number from N.

Letter $\underline{b}$ is a coefficient of exposure correction. A set of shutter speed and stop giving an optimum exposure to a particular film is determinable from the sensitivity and LV of the film. If an actual exposure is over or under the optimum exposure, the coefficient of exposure correction $\underline{b}$ is determined in accordance with a coefficient of exposure $\underline{m}$ as shown in Table 1.

It is to be noted that the coefficient of exposure $\underline{m}$ is defined as $$m = \log E/S / \log 2$$

wherein S is a film sensitivity in ASA and E is an exposure quantity of an exposed frame in lux×sec.

Letter $\underline{c}$ is a coefficient of strobe correction. When a strobe is flashed, there is the general tendency that when $E \geq S$, the exposure of a front object or person is increased and the amount of silver developed is increased about 10% and when $E \leq S$, the exposure of a front object or person is greater than the average exposure of the entire frame, but the surrounding is less exposed and as a consequence, the amount of silver developed is decreased about 10 to 20%. Therefore, whether or not the strobe is flashed constitutes a coefficient of correction. It is determined as shown in Table 1.

Letter $\underline{d}$ is a coefficient of rear light correction. In the case of shooting under a rear light condition, there is the general tendency opposite to the tendency occurring with strobe flashing. Therefore, whether or not rear light is present constitutes a coefficient of correction. It is determined in an inverse relationship to the coefficient of strobe correction $\underline{c}$ as shown in Table 1.

TABLE 1

| S | E | E/S | logE/S | m | b | c, flash Yes | c, flash No | d, rear light Yes | d, rear light No |
|---|---|---|---|---|---|---|---|---|---|
| 100 | 1600 | 16 | 4log2 | +4 | 1.6 | 1.10 | 1 | 1.20 | 1 |
| 100 | 800 | 8 | 3log2 | +3 | 1.45 | 1.10 | 1 | 1.20 | 1 |
| 100 | 400 | 4 | 2log2 | +2 | 1.3 | 1.10 | 1 | 1.20 | 1 |
| 100 | 200 | 2 | 1log2 | +1 | 1.15 | 1.10 | 1 | 1.10 | 1 |
| 100 | 100 | 1.0 | 0 | 0 (optimum) | 1 | 1 | 1 | 1 | 1 |
| 100 | 50 | 0.5 | −1log2 | −1 | 0.85 | 0.9 | 1 | 0.9 | 1 |
| 100 | 25 | 0.25 | −2log2 | −2 | 0.70 | 0.8 | 1 | 0.9 | 1 |
| 100 | 12.5 | 0.125 | −3log2 | −3 | 0.55 | 0.8 | 1 | 0.9 | 1 |
| 100 | 6.25 | 0.0625 | −4log2 | −4 | 0.40 | 0.8 | 1 | 0.9 | 1 | m = logE/S/log2

In the above embodiment, the algorithm uses all the coefficients of correction $\underline{a}$, $\underline{b}$, $\underline{c}$ and $\underline{d}$ although computation can be made using one or two or three of these coefficients. In formula (1), any one, two or three of the four coefficients of correction $\underline{a}$ and all $\underline{bj}$, $\underline{cj}$, and $\underline{dj}$ are assumed to be unity, and the remaining three, two or one coefficient is used in computation to determine g. It is preferred, however, that two to four coefficients are used in computation while the remaining two, one or zero coefficient is assumed to be unity. Most often, the coefficient of blank frame correction $\underline{a}$ is always used in computation since the number of blank frames has the greatest influence on the exhaustion of processing solution.

On the other hand, the coefficient of density correction $e_0$ is determined by plotting the average density H of exposed frames 90 in the graph of FIG. 5.

Figure 6:
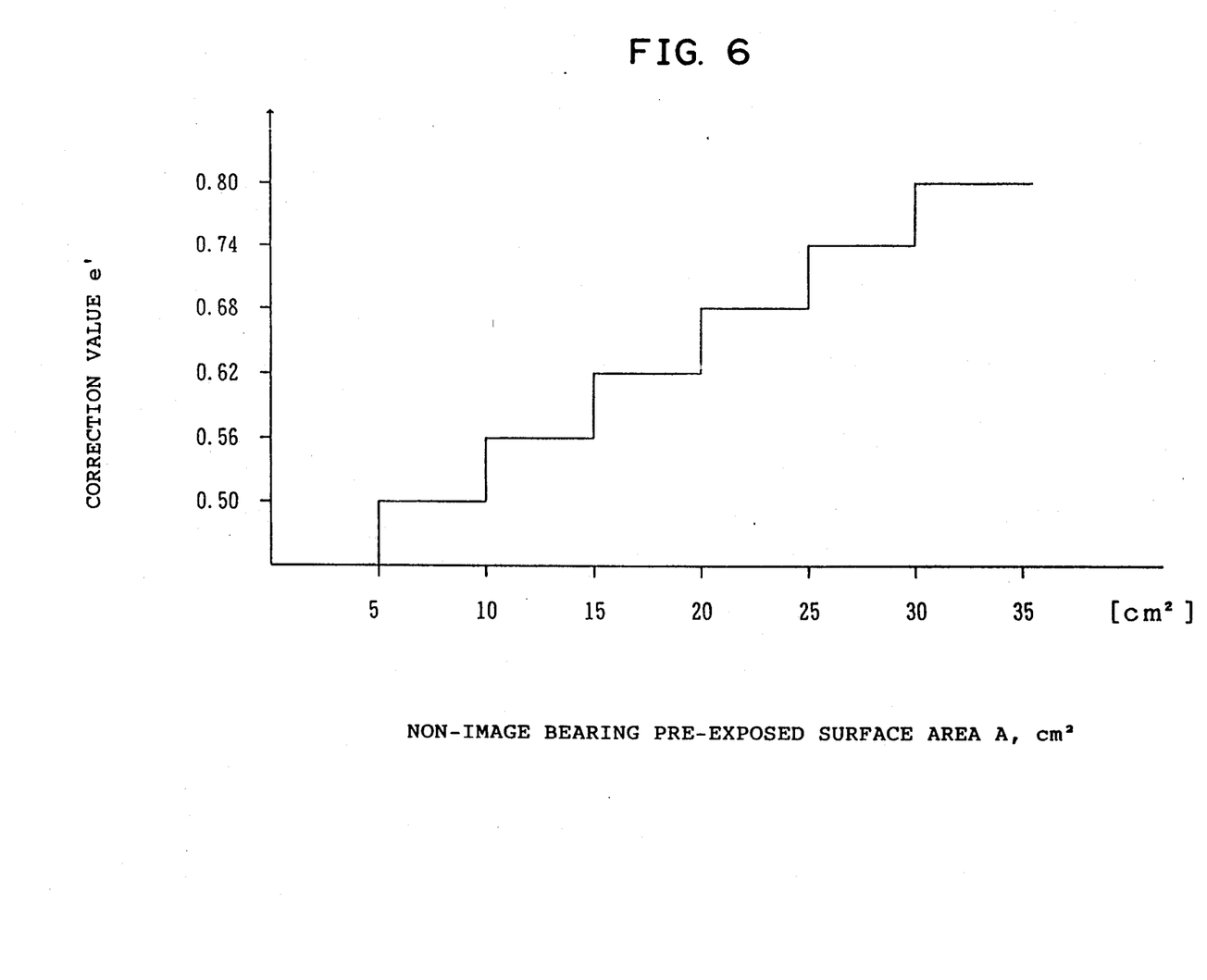
FIG. 6 is a graph showing a correction value $e'$ versus the surface area A of a pre-exposed leader portion of a processed film.

Since some types of film have a pre-exposed leader portion as previously mentioned, the area A of the exposed leader portion is detected by the density detector means 88 and a correction value $\underline{e}'$ is determined on the basis of this area A. Correction is made by adding the correction value $\underline{e}'$ to the coefficient of density correction $e_0$. The correction value $e'$, is obtained by plotting the area A in the graph of FIG. 6. Correction of replenishing amount on the basis of a pre-exposed leader portion of film may be done in a separate way by separately determining a corrected replenishing amount and supplying the corrected amount of replenisher solution.

From the above-mentioned operations, coefficients $g$ and $e$ $(=e_0+e')$ associated with the replenishment of processing solution are determined on the basis of the picture information of each exposed frame and the printing information. Then the standard replenishing amount Ro is multiplied by the coefficient of density correction $e$ based on the density signal measured in the printing apparatus 8 and the coefficient of correction $g$ determined on the basis of the picture shooting information, determining corrected replenishing amounts $Re=e\times Ro$ and $Rg=g\times Ro$. Then an actual replenishing amount R is determined, for example, by the equation:

$$R=(Re+Rg)/2$$

In this way, R is determined by dividing Ro into two equal portions and multiplying one-half Ro by coefficients of correction $e$ and $g$.

In accordance with the aforementioned procedure, the amounts R of processing solutions to be replenished are determined. Then the replenishing means 7 are controlledly operated in accordance with the thus determined replenishing amounts R, supplying optimum amounts of processing solutions to the associated tanks.

It is to be noted that although the coefficient of exposure correction $b$ is determined using the coefficient of exposure $m$ as a parameter, the exposure E may be used as a parameter if the film sensitivity is fixed. In this case, if one of stop and shutter speed is fixed, the other may be used as a parameter.

In the embodiment illustrated herein, the amount of processing solution to be replenished is controlled to provide an optimum processing condition, but instead or additionally, another factor or factors such as the feed rate or processing time of film and the temperature and concentration of processing solution may be controlled to provide an optimum processing condition.

The thus computed replenishing amount may be used as the total amount of every replenishment step. Alternatively, more than about 50% of the amount of every replenishment step is a variable portion which can be increased or decreased in accordance with the correcting computation while the remainder being a fixed amount of replenishment. Assume that 80 ml of solution should be replenished in processing a roll of color negative film (24 frames), for example. Upon entry of the film into the processor, a part of the necessary replenishing amount, for example, 40 ml ($=80$ ml$\times\frac{1}{2}$) is replenished and ($40\times e$) ml is replenished on the basis of the coefficient of density correction $e$ of the processed film. The latter variable portion may also be determined as ($80\times e$ 40) ml.

Alternatively, 50% of the replenishing amount is increased or decreased on the basis of the coefficient of correction $g$ associated with the picture shooting information and the remainder is corrected using the coefficient of density correction $e$.

The replenishing amount determined on the basis of the coefficient of density correction $e$ (printing information) or the coefficient of density correction $e$ (printing information) and the coefficient of correction $g$ (picture shooting information) should preferably be about $\frac{1}{8}$ to 1, especially about $\frac{1}{8}$ to $\frac{5}{8}$ of the standard replenishing amount.

Determination of replenishing amount and execution of replenishment is generally carried out for a predetermined number of film strips.

Although the method of the present invention has been described with respect to the development of color negative film, the invention is not limited thereto. The invention is also applicable to various photographic picture-taking photosensitive materials such as graphic art photosensitive material, color reversal film, X-ray film, color paper, black-and-white negative film, direct positive color photosensitive material, micro film, and color reversal paper. All these photosensitive materials are herein designated photographic picture-taking films.

Although the control of the amounts of developing and bleaching solutions replenished has been described, the arrangement may expanded so as to additionally control the amounts of fixer, washing water, and stabilizer to be replenished. In the case of color film processing, it is effective to control the amounts of developing, bleaching and blix solutions to be replenished in order that the developed silver be appropriately bleached.

The processing tanks as typified by the developing tank 31 may be ones having a narrow processing path as disclosed in Japanese Patent Application Nos. 89052/1987, 131138/1988, 216050/1988, 26855/1989, and 130548/1989 because the advantages including reduced processing solution replenishing amount, reduced waste solution amount, improved processing efficiency, reduced size of processor are achieved. Additionally, the control of the amount of processing solution replenished according to the invention become more effective since the amount of processing solution replenished to each tank is very small.

The photosensitive material, processing solution composition, processing procedure may be conventional and are described in the literature and patents including those referred herein.

Figure 8:
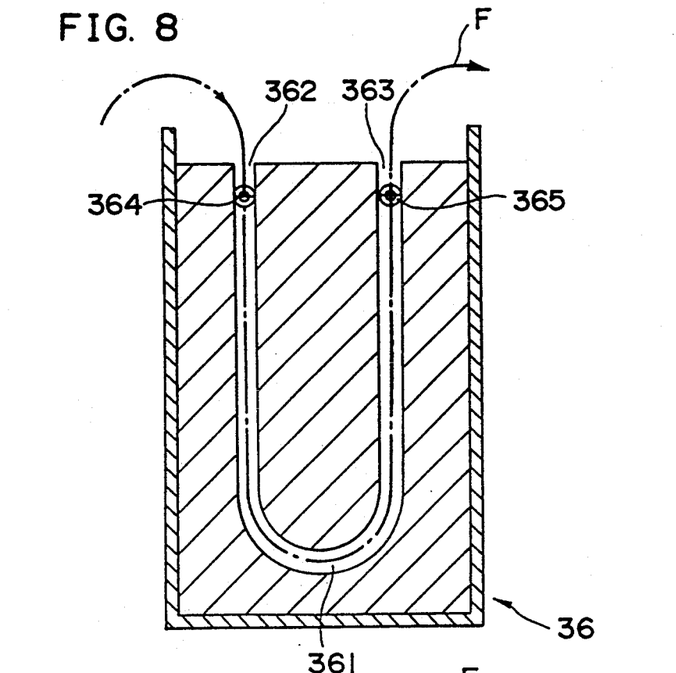
FIG. 8 is a schematic view showing the structure of a slit type processing tank used in the Experiment.

Referring to FIGS. 8 and 9, the construction of the processing tank is described. FIG. 8 is a vertical cross section of a processing tank 36 defining a narrow processing space 361 providing a path for passing a strip of film F from an entrance 362 to an exit 363. The processing space 361 which is slit shaped in a horizontal cross section and U shaped in a vertical cross section is filled with processing solution. An inlet port 364 is provided near the entrance 362 and an outlet port 365 is provided near the exit 363 of the space 361 whereby the processing solution is fed through the inlet port 364 and discharged through the outlet port 365. By replenishing fresh processing solution from the inlet port 364, the processing solution in the space 361 is forced out through the outlet port 365 in an overflow manner. As the film F is passed through the space 361, it is contacted and processed with the processing solution.

This construction is effective in reducing the amount of processing solution and facilitating the replacement of processing solution by replenishment.

Figure 9:
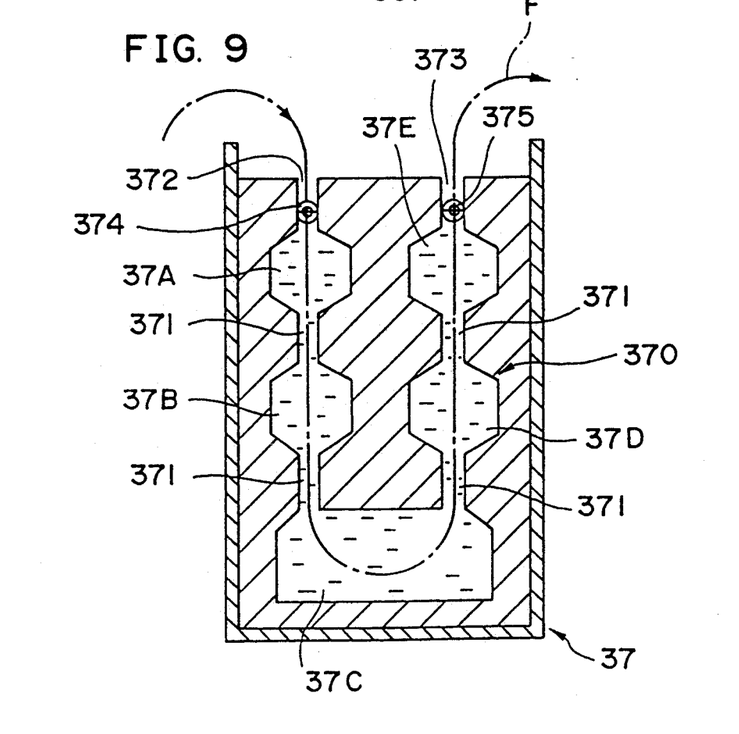
FIG. 9 is a schematic view showing the structure of a multiple-compartment, slit type processing tank used in the Experiment.

FIG. 9 is a vertical cross section of a processing tank 37 including a plurality of processing compartments 37A to 37E in serial flow communication through narrow channels 371 defining a continuous processing path 370 for passing a strip of film F from an entrance 372 to an exit 373. The path 370 is filled with processing solution. As the film F is passed through the path 370, it is contacted and processed with the processing solution.

The processing solution is fed and discharged through an inlet port 374 near the entrance 372 and an outlet port 375 near the exit 373. By replenishing fresh processing solution from the inlet port 374, the processing solution in the path 370 is forced out through the outlet port 375 in an overflow manner. Since fluid communication between two adjacent compartments is allowed only through the narrow channel 371, a gradient of concentration is established among the compartments 37A to 37E, providing better processing performance with a smaller amount of processing solution.

EXPERIMENT

In the embodiment of FIGS. 1 to 3 including the processor and printing apparatus combined, the amounts R1 and R2 of processing solutions replenished to the color developing and bleaching tanks were controlled by using the density value given by the exposure control means of the printing apparatus.

The processor used was a color negative film processor FP-230B of Champion FA120 system manufactured by Fuji Photo-Film Co., Ltd. Two printing apparatus, modified machines of color paper processor PP 400B manufactured by Fuji Photo-Film Co., Ltd. were electrically connected to the processor. That is, the printing apparatus was a printer section taken out of the processor PP-400B.

The experiment was carried out as follows. The processing procedure and processing solution compositions are the same as described in Example 1 of Japanese Patent Application Kokai No. 139548/1990. Briefly stated, the solutions used were a color developer, bleaching solution, fixer, and stabilizer, and the procedure included color development at 37.8° C. for 3'15", bleaching at 38° C. for 45", fixation at 38° C. for 90", and stabilization at 38° C. for 60".

Photosensitive Materials

Photosensitive material 1 is described in Example 1 of Japanese Patent Application Kokai No. 250052/1990, that is, a picture-taking color negative film having 14. emulsion and other photographic layers on a primed TAC film support. Each strip of film contained a pre-exposed (fogged) leader portion.

Photosensitive material 2 is the same as Photosensitive material 1 except that it has perforations and a magnetic recording track as shown in FIG. 4. Each strip of film contained one perforation per frame on one side. Each strip of film was free of a pre-exposed (fogged) leader portion. In the magnetic recording track, bits of picture shooting information including the number of blank frames, exposure conditions, strobe flashing, and rear light were recorded.

EXPERIMENT I

Photosensitive material was processed under different set of conditions (including processing tank and standard replenishing amount) while the replenishing amount was determined by the following procedures A to E.

PROCEDURE A

Photosensitive material 2 was used. Running cycles of processing 2,000 rolls of 2-stop under-exposed film and 2,000 rolls of 2-stop over-exposed film were repeated until 4,000 rolls were processed. The standard replenishing amounts were used.

This running process was repeated in Procedures B to E except the determination of replenishing amounts.

PROCEDURE B

The amounts of processing solutions corresponding to one half of the standard replenishing amounts, that is, $R_{10}/2$ and $R_{20}/2$, were replenished. The density of processed film was measured during printing, and a coefficient of density correction $e$ was determined therefrom. The remaining one half replenishing amounts were increased or decreased in accordance with $e$. Thus the replenishing amounts R1 and R2 are determined by the following equations.

$$R1 = R_{10}/2 + e \times (R_{10}/2)$$

$$R2 = R_{20}/2 + e \times (R_{20}/2)$$

In determining the coefficient of density correction $e$, the graph of FIG. 5 was used for both R1 and R2.

PROCEDURE C

In Procedure B, a coefficient of correction $g$ was used instead of the coefficient of density correction $e$. The coefficient of correction $g$ was determined from the picture shooting information of each exposed frame in accordance with equation (1) and Table 1. Thus the replenishing amounts R1 and R2 are determined by the following equations.

$$R1 = R_{10}/2 + g \times (R_{10}/2)$$

$$R2 = R_{20}/2 + g \times (R_{20}/2)$$

PROCEDURE D

The coefficients of correction $e$ and $g$ were determined as in Procedures B and C. The replenishing amounts R1 and R2 are determined by the following equations.

$$R1 = R_{10}/2 + [(e+g)/2] \times (R_{10}/2)$$

$$R2 = R_{20}/2 + [(e+g)/2] \times (R_{20}/2)$$

PROCEDURE E

The coefficients of correction $e$ and $g$ were determined as in Procedures B and C. The replenishing amounts R1 and R2 are determined by the following equations.

$$R1 = (R_{10}/2) \times g + (R_{10}/2) \times e$$

$$R2 = (R_{20}/2) \times g + (R_{20}/2) \times e$$

It is to be noted that $g$ is determined from a coefficient of blank frame correction $a$. Three different sets of conditions were used.

CONDITION 0

Processing tank
Mini-labo processor
  developing tank: 9 liters
  bleaching tank: 4 liters
  Standard replenishing amounts
Development $R_{10}$: 45 ml/35 mm×1 m
Bleaching $R_{20}$: 20 ml/35 mm×1 m

CONDITION 1

Processing tank
Slit type processing tank as shown in FIG. 8
  developing tank: 450 ml
  bleaching tank: 250 ml
Standard replenishing amounts
Development $R_{10}$: 42 ml/35 mm×1 m
Bleaching $R_{20}$: 18 ml/35 mm×1 m

CONDITION 2

Processing tank
Multi-compartment processing tank as shown in FIG. 9
  developing tank: 1.5 liters
  bleaching tank: 0.8 liters
Standard replenishing amounts
Development $R_{10}$: 42 ml/35 mm×1 m
Bleaching $R_{20}$: 18 ml/35 mm×1 m Runs were made under conditions 0 to 2 according to Procedures A to E, which are designated Runs A0 to A2, B0 to B2, C0 to C2, D0 to D2, and E0 to E2. A sensitivity change per 500 rolls of film was determined by examining a deviation of the LD (sensitivity) value of a control film. The results are shown in Table 2.

TABLE 2

| Condition | Replenishing amount determining procedure | | | | |
|---|---|---|---|---|---|
| | A | B | C | D | E |
| 0 | A0/ | B0/ | C0/ | D0/ | E0 |
| | ±0.07 | ±0.04 | ±0.03 | ±0.03 | ±0.03 |
| 1 | A1/ | B1/ | C1/ | D1/ | E1 |
| | ±0.15 | ±0.05 | ±0.03 | ±0.03 | ±0.03 |
| 2 | A2/ | B2/ | C2/ | D2/ | E2 |
| | ±0.13 | ±0.05 | ±0.03 | ±0.03 | ±0.03 |

EXPERIMENT II

Runs A0 to A2 and B0 to B2 of Experiment I were repeated except that both Photosensitive Materials 1 and 2 were processed and the standard replenishing amounts were changed. A sensitivity change was examined by the same method as in Experiment I. The correction associated with the pre-exposed leader portion was made by adding e' to the value of e. The correction value e' was obtained from the graph of FIG. 6. Frames were judged to be exposed when they have a density of at least 0.03. The non-image-bearing pre-exposed leader portion was detected as a portion from the film leading edge to where an unexposed portion was first detected.

The results are shown in Table 3. It is seen that better results are obtained according to the method of the invention when the processing tanks have a volume of up to 2 liters and the replenishing amounts are up to 21 ml/m².

consistent uniform processing and maintain stable processing ability even when combined with a small size processor having tanks of small volume. The replenishing amounts can be controlled to achieve optimization resulting in a saving of processing solution.

Although some preferred embodiments have been described, many modifications and variations may be made thereto in the light of the above teachings. It is therefore understood that within the scope of the appended claims, the invention may be practiced otherwise than as specifically described.

We claim:

1. A method for continuously processing a plurality of photographic picture-taking films, comprising the steps of:
   obtaining at least one of the printing information used in making a print from a processed film and the density information of the processed film,
   determining a processing condition using the information as a decisive factor, and
   processing a subsequent film under the determined condition.

2. The method of claim 1 wherein said photographic picture-taking film has picture information born on itself or on a container for the film, and
   the step of determining a processing condition further uses the picture information as another decisive factor.

3. The method of claim 1 wherein the processing condition is an amount of processing solution to be replenished, and
   the step of determining a processing condition includes the steps of:
   predetermining a standard amount of processing solution to be replenished during processing,
   determining a coefficient of correction from said printing information and/or said density information, and
   multiplying the standard amount by the coefficient of correction, thereby determining the amount of processing solution to be replenished.

4. The method of claim 3 wherein the step of determining an amount of processing solution to be replenished includes the steps of:
   determining a first coefficient of correction from the picture information,
   determining a second coefficient of correction from the printing information and/or the density information of the processed film,
   dividing the standard amount into two portions,
   multiplying the divided standard amount portions by the first and second coefficients of correction, respectively, and

TABLE 3

| Run | Film | A0 | | B0 | | A1 | | B1 | | A2 | | B2 | |
|---|---|---|---|---|---|---|---|---|---|---|---|---|---|
| | | 1 | 2 | 1 | 2 | 1 | 2 | 1 | 2 | 1 | 2 | 1 | 2 |
| | | Standard replenishing amount (ml/m²) | | | | | | | | | | | |
| 45 | | ±0.13 | | ±0.10 | | ±0.22 | | ±0.11 | | ±0.20 | | ±0.11 | |
| | | | ±0.07 | | ±0.04 | | ±0.15 | | ±0.05 | | ±0.13 | | ±0.05 |
| 33 | | ±0.14 | | ±0.11 | | ±0.29 | | ±0.15 | | ±0.28 | | ±0.15 | |
| | | | ±0.07 | | ±0.04 | | ±0.20 | | ±0.04 | | ±0.19 | | ±0.04 |
| 22 | | ±0.14 | | ±0.11 | | ±0.30 | | ±0.16 | | ±0.29 | | ±0.17 | |
| | | | ±0.08 | | ±0.03 | | ±0.22 | | ±0.03 | | ±0.20 | | ±0.03 |
| 11 | | ±0.15 | | ±0.12 | | ±0.30 | | ±0.18 | | ±0.30 | | ±0.19 | |
| | | | ±0.08 | | ±0.03 | | ±0.23 | | ±0.03 | | ±0.20 | | ±0.03 |

There has been described a method for processing photographic picture-taking films which can achieve adding the multiplied values.

5. The method of claim 3 wherein the step of determining an amount of processing solution to be replenished includes the steps of:
   determining a coefficient of correction from the printing information and/or the density information of the processed film,
   dividing the standard amount into two portions, one divided standard amount portion being a fixed amount,
   multiplying the other divided standard amount portion by the coefficient of correction, and
   adding the multiplied portion to the fixed amount.

6. The method of claim 1 wherein the processing condition is an amount of processing solution to be replenished during processing, and the step of determining a processing condition includes the steps of:
   predetermining a standard amount of processing solution to be replenished Ro during processing on the basis of the film information read from the unprocessed film or cassette,
   dividing the standard replenishing amount Ro into a fixed amount Ro' and a variable amount Ro",
   determining a coefficient of correction $\underline{e}$ from the printing information or density information associated with the processed film and computing a replenishing amount Re=Ro"×e,
   replenishing the processing solution in an amount of the fixed amount Ro' plus the corrected replenishing amount Re.

7. The method of claim 6 further including the steps of
   determining a coefficient of correction g from the picture information associated with the film and computing a replenishing amount Rg=Ro"×g, and
   determining the corrected replenishing amount by averaging Re and Rg.

8. The method of claim 7 wherein the picture information includes the number of exposed frames and the degree of over- or under-exposure.

9. The method of claim 8 wherein the film contains up to 4 perforations per frame along at least one lateral edge thereof.

10. A system including a processing apparatus for continuously processing a plurality of photographic picture-taking films and a printing apparatus interconnected to the processing apparatus for making prints from the processed films wherein each length of exposed film in roll form is contained in a cassette and the film itself or the cassette carries picture information thereon,
   the processing apparatus including a supply means for storing cassettes, a loading means for loading the apparatus with the film by pulling out the film leader from the cassette, a reading means for reading the picture information on the film or cassette, a cutter means for cutting the film at the trailing edge to free the film from the cassette, and a bonding means for bonding the leading edge of the film to the trailing edge of a preceding length of film,
   the printing apparatus providing at least one of the printing information used in making a print from a processed film and the density information of the processed film,
   the printing apparatus being electrically connected to the processing apparatus through a control unit so that the information is delivered to the control unit for determining a processing condition.

11. The system of claim 10 wherein the processing condition is an amount of processing solution to be replenished during processing which is determined by
   predetermining a standard amount of processing solution to be replenished Ro during processing on the basis of the film information read from the unprocessed film or cassette,
   dividing the standard replenishing amount Ro into a fixed amount Ro' and a variable amount Ro",
   determining a coefficient of correction $\underline{e}$ from the printing information or density information associated with the processed film and computing a replenishing amount Re=Ro"×e,
   replenishing the processing solution in an amount of the fixed amount Ro' plus the corrected replenishing amount Re.

12. A method for continuously processing a plurality of photographic picture-taking films in a film processing device which includes a processing apparatus for continuously processing a plurality of photographic picture-taking films and a printing apparatus interconnected to the processing apparatus for making prints from the processed films wherein each length of exposed film in roll form is contained in a cassette and the film itself or the cassette carries picture information thereon, the processing apparatus including a supply means for storing cassettes, a loading means for loading the apparatus with the film by pulling out the film leader from the cassette, a reading means for reading the picture information on the film or cassette, a cutter means for cutting the film at the trailing edge to free the film from the cassette, and a bonding means for bonding the leading edge of the film to the trailing edge of a preceding length of film, the printing apparatus providing at least one of the printing information used in making a print from a processed film and the density information of the processed film, the printing apparatus being electrically connected to the processing apparatus through a control unit so that the information is delivered to the control unit for determining a processing condition, wherein the method comprises the steps of:
   obtaining at least one of printing information used in making a print from a processed film and density information of the processed film,
   determining a processing condition using the obtained information as a decisive factor, and
   processing a subsequent film under the determined condition.

13. The method of claim 12 wherein said photographic picture-taking film has picture information born on itself or on a container for the film, and
   the step of determining a processing condition further uses the picture information as another decisive factor.

14. The method of claim 12 wherein the processing condition is an amount of processing solution to be replenished, and
   the step of determining a processing condition includes the steps of:
      predetermining a standard amount of processing solution to be replenished during processing,
      determining a coefficient of correction from at least one of said printing information and said density information, and
      multiplying the standard amount by the coefficient of correction, thereby determining the amount of processing solution to be replenished.

15. The method of claim 14 wherein the step of determining an amount of processing solution to be replenished includes the steps of:
- determining a first coefficient of correction from the picture information,
- determining a second coefficient of correction from at least one of the printing information and the density information of the processed film,
- dividing the standard amount into two portions,
- multiplying the divided standard amount portions by the first and second coefficients of correction, respectively, and
- adding the multiplied values.

16. The method of claim 15 wherein the step of determining an amount of processing solution to be replenished includes the steps of:
- determining a coefficient of correction from at least one of the printing information and the density information of the processed film,
- dividing the standard amount into two portions, one divided standard amount portion being a fixed amount,
- multiplying the other divided standard amount portion by the coefficient of correction, and
- adding the multiplied portion to the fixed amount.

17. The method of claim 2 wherein the processing condition is an amount of processing solution to be replenished during processing, and the step of determining a processing condition includes the steps of:
- predetermining a standard amount of processing solution to be replenished Ro during processing on the basis of the film information read from the unprocessed film or cassette,
- dividing the standard replenishing amount Ro into a fixed amount Ro' and a variable amount Ro",
- determining a coefficient of correction e from the printing information or density information associated with the processed film and computing a replenishing amount $Re = Ro'' \times e$,
- replenishing the processing solution in an amount of the fixed amount Ro' plus the corrected replenishing amount Re.

18. The method of claim 17 further including the steps of
- determining a coefficient of correction g from the picture information associated with the film and computing a replenishing amount $Rg = Ro' \times g$, and
- determining the corrected replenishing amount by averaging Re and Rg.

19. The method of claim 18 wherein the picture information includes the number of exposed frames and the degree of over-or under-exposure.

20. The method of claim 19 wherein the film contains up to 4 perforations per frame along at least one lateral edge thereof.

* * * * *